Figure 1:
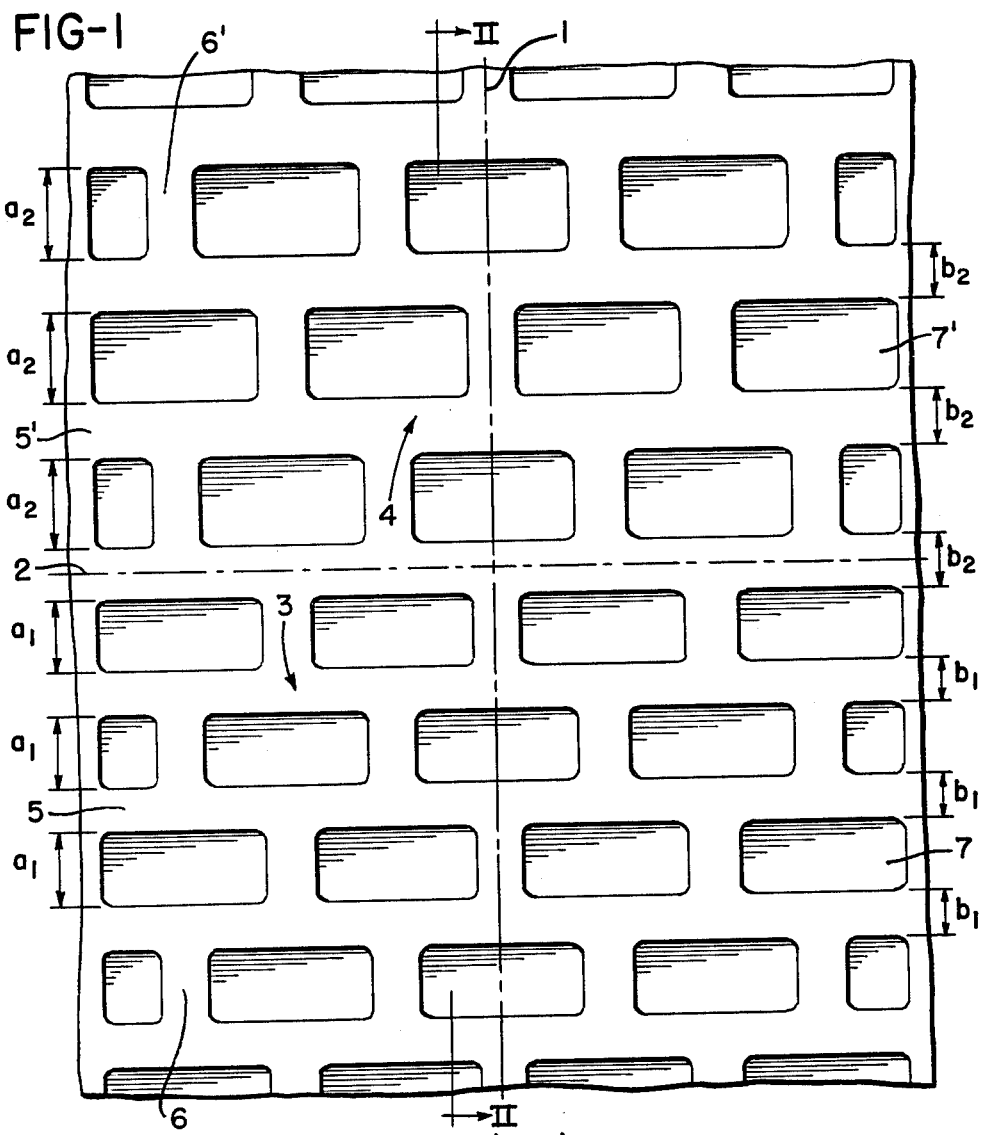

United States Patent [19]

Seitz et al.

[11] 4,424,846
[45] Jan. 10, 1984

[54] TREAD CONFIGURATION FOR PNEUMATIC VEHICLE TIRES

[75] Inventors: Hans Seitz, Langenhagen; Heinz-Dieter Rach, Garbsen; Henner Pieper; Udo Frerichs, both of Langenhagen, all of Fed. Rep. of Germany

[73] Assignee: Continental Gummi-Werke Aktiengesellschaft, Hanover, Fed. Rep. of Germany

[21] Appl. No.: 419,413

[22] Filed: Sep. 17, 1982

[30] Foreign Application Priority Data

Sep. 19, 1981 [DE] Fed. Rep. of Germany ....... 3137334

[51] Int. Cl.³ .................... B60C 11/06; B60C 11/08
[52] U.S. Cl. ................................ 152/209 R; D12/140
[58] Field of Search ........... 152/209 R, 209 A, 209 B, 152/209 NT, 209 WT, 209 D, 152, 352 A; D12/136, 138, 140, 141, 150

[56] References Cited

U.S. PATENT DOCUMENTS 2,006,197  6/1935  Ewart et al. ................... 152/209 R
2,255,994  9/1941  Bush ............................. 152/209 R
2,621,698 12/1952  Zohrer ........................... 152/209 R
3,004,578 10/1961  Braudorn ....................... 152/209 R
3,861,436  1/1975  Poque ........................... 152/209 R
3,926,238 12/1975  Vorih ........................... 152/209 R
3,951,191  4/1976  Suzuki et al. ................. 152/209 R
4,337,813  7/1982  Rach et al. .................... 152/209 R Primary Examiner—Edward C. Kimlin
Assistant Examiner—F. K. Wine
Attorney, Agent, or Firm—Becker & Becker, Inc.

[57] ABSTRACT

A tread configuration for pneumatic vehicle tires, especially for spare tires. A number of rectangular depressions are arranged in succession and next to each other in the circumferential direction of the tire. Transverse ribs and circumferential ribs separate the depressions from one another and have a width which is approximately $\frac{1}{4}$ to $\frac{3}{4}$ of the circumferential dimension of the depressions. The radially outwardly located peripheral surface of the tire is subdivided into several segments. The circumferential dimension of the depressions and of the transverse ribs is constant within each of the segments, and the circumferential dimension of the depressions and of the transverse ribs is different in successive segments.

8 Claims, 2 Drawing Figures

TREAD CONFIGURATION FOR PNEUMATIC VEHICLE TIRES

The present invention relates to a tread configuration for pneumatic vehicle tires, especially for spare tires; a number of depressions are arranged next to each other and one after the other when viewed in the circumferential direction of the tire. These depressions are substantially rectangular, and extend transverse to the circumferential direction of the tire. Transverse ribs and circumferential ribs separate the depressions from one another and have a width which is approximately ¼ to ¾ of the circumferential dimension of the adjacent depressions.

Similar tread configurations have been proposed for spare tires for passenger vehicles in order to attain a noisy rolling of the tire along a street or roadway, and in order to reduce the weight of spare tires.

Although these previously known spare tires produce more noise than do conventional tires, it has been found that the operating or running sounds or noises stemming from the tires are not sufficient in all cases to draw the attention of a passenger vehicle driver to the fact that a spare tire has been mounted which should possibly be replaced immediately.

It is therefore an object of the present invention to provide a tread configuration which produces more noise during driving operation.

Figure 2:
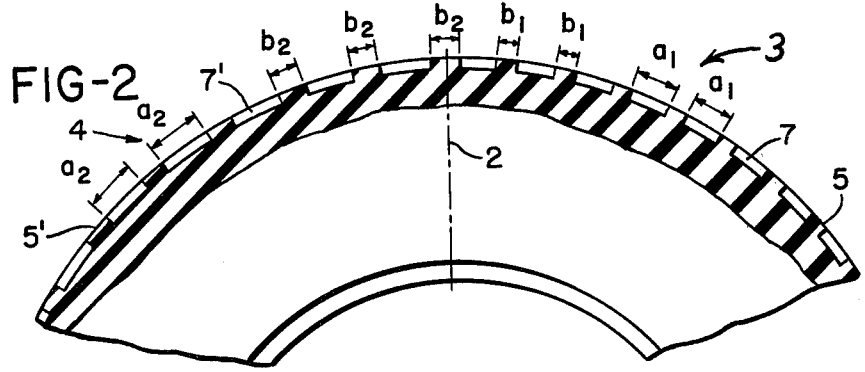

This object, and other objects and advantages of the present invention, will appear more clearly from the following specification in connection with the accompanying drawing, in which:

FIG. 1 is a schematic fragmentary plan view of an outer peripheral surface of one embodiment of the inventive tread configuration for a spare tire for road vehicles; and FIG. 2 is a fragmentary sectional view of the tire taken in a plane at right angles to the axial direction along line II—II in FIG. 1.

The tread configuration of the present invention is characterized primarily in that the radially outwardly located peripheral surface of the tire is subdivided into several segments, in that within each of the segments the circumferential dimension of the depressions and of the transverse ribs is constant, and in that in successive segments, the circumferential dimension of the depressions and of the transverse ribs is different.

According to further advantageous embodiments of the present invention, each segment may comprise between 25 and 75% of the entire peripheral surface of the tire. The circumferential dimensions of the depressions and of the transverse ribs of two successive segments may respectively have a ratio of 6:10 to 9:10, preferably 8:10.

The peripheral surface of the tread may be divided into two equally long segments.

The depressions may have a profile depth of approximately 4 mm.

The tire substructure may be of bias ply or radial construction.

Referring now to the drawing in detail, the center of the tread is represented by a line 1, which at the same time represents the circumferential direction of the tire.

A line 2 extending in the axial direction serves to subdivide the outer peripheral surface of the tire into several segments, and in the drawing into two equally long segments 3,4, i.e., into two halves.

The tread profile in the first segment 3 essentially comprises transverse pieces or ribs 5 which extend uninterruptedly and continuously from one tread edge to the other tread edge; the transverse ribs 5 are connected by short circumferential ribs 6 which extend in the circumferential direction, and in particular in such a manner that the ribs 6 are displaced or offset relative to one another when viewing successive pairs of transverse ribs 5.

The ribs 5,6 essentially delimit transversely extending rectangular depressions 7 having a width $a_1$. Due to the ribs 5,6, the depressions 7 form cell-like enclosures when the associated portion of the tread fully engages the roadway. The width $b_1$ of the transverse ribs 5 is slightly greater than half the circumferential dimension (i.e. $a_1$) of the depressions 7, or in other words approximately half of the distance between successive transverse ribs 5. This dimension can also apply to the circumferential ribs 6, which however are spaced from one another in the transverse direction by a distance approximately equal to four times their width.

The tread configuration in the second segment 4 of the tread is similar to that in the first segment 3. In this connection, the term "similar" is to be understood in a geometric sense, at least with respect to the widths of the transverse ribs 5, 5' and of the depressions 7, 7'; thus, $a_1:a_2=b_1:b_2$, where $a_2$ represents the width of a depression 7', and $b_2$ represents the width of a transverse rib 5' in the second segment 4 of the tread. In the present example, the ratio $a_1:a_2$ has a value of 4/5.

Within each segment 3,4, the respective depressions 7,7', transverse ribs 5,5', and circumferential ribs 6,6' have the same dimensions, while the profile depth of both of the segments 3 and 4 is the same, namely approximately 4 mm.

In addition to the situation described in the sample embodiment, the peripheral surface can also be subdivided into more than two segments, and where there are two segments, it can also be advantageous to have different lengths for the two segments. In either case, each of the segments should preferably have a length of 25 to 75% of the entire circumferential length.

When selecting two or four segments, and depressions 7,7' and transverse ribs 5,5' with two different widths $a_1$, $a_2$ and $b_1$, $b_2$, the width ratios $a_1:a_2$ and $b_1:b_2$ should be between 6:10 and 9:10.

However, it is also possible to subdivide the peripheral surface of the tire, for example, into three segments with different widths for the depressions and the ribs from segment to segment; however, also in this situation, the different depressions and transverse ribs should be geometrically similar.

It should be noted that the invention tread configuration, due to the small profile depth, can be employed in an outstanding manner not only for radial tires, but also for bias ply tires.

The present invention offers the advantage not only of producing more noise, but also a greater number of different noise tones of specific frequency during operation, which affects the ear of the driver, and is particularly uncomfortable at high speeds. As a result, the driver is induced to slow down, and to replace the spare tire—which was mounted when the regular tire went flat, for instance—as soon possible with a regular tire.

As a result of the small profile depth of the depressions of only about 4 mm, the further advantage results that a spare tire having the invention tread configuration can have a substructure of either bias ply or radial construction.

The present invention is, of course, in no way restricted to the specific disclosure of the specification and drawing, but also encompasses any modifications within the scope of the appended claims.

What is claimed is:

1. A tread configuration for the radially outwardly located peripheral surface of a pneumatic vehicle tire used as a spare tire to replace a regular tire that went flat, for example, said tread configuration comprising in combination:

transverse ribs respectively extending transverse to the circumferential direction of said tire; and circumferential ribs respectively extending in the circumferential direction of said tire and interconnecting said transverse ribs in such a way as to define a plurality of separate essentially rectangular depressions therewith, the larger dimension of each of said depressions extending transverse to the circumferential direction of said tire; with the narrower dimension of each of said transverse and circumferential ribs being approximately $\frac{1}{4}$ to $\frac{3}{4}$ of the circumferential dimension of an adjacent depression, the number of said transverse and circumferential ribs being such that, when viewed in the circumferential direction of said tire, several depressions are disposed next to one another, and a plurality of depressions are disposed one after the other; said peripheral surface of said tire being divided into at least two segments; within a given segment, the circumferential dimension of said depressions is constant, and the circumferential dimension of said transverse ribs is constant, while the circumferential dimension of said depressions, and the circumferential dimension of said transverse ribs of a given segment differ from those of a successive segment so that there is attained advantageously the production of more noise and a greater number of noise tones of specific frequency during operation, which affects the ear of the driver and is particularly uncomfortable at high speeds, and as a result, the driver is induced to slow down, and to replace the spare tire, which was mounted when the regular tire went flat, for instance, as soon as possible with a regular tire.

2. A tread configuration in combination according to claim 1, in which each segment comprises between 25 and 75% of the entire peripheral surface of said tire.

3. A tread configuration in combination according to claim 2, in which the ratio of the circumferential dimension of said depressions of a given segment to that of a successive segment, and the ratio of the circumferential dimension of said transverse ribs of a given segment to that of a successive segment, is from 6:10 to 9:10.

4. A tread configuration in combination according to claim 3, in which said ratio is 8:10.

5. A tread configuration in combination according to claim 2, in which said peripheral surface of said tire is divided into two segments of equal length.

6. A tread configuration in combination according to claim 1, in which said depressions have a profile depth of approximately 4 mm.

7. A tread configuration in combination according to claim 1, in which said tire has a substructure of bias ply construction.

8. A tread configuration in combination according to claim 1, in which said tire has a substructure of radial construction.

* * * * *